March 16, 1943. G. H. ALVEY ET AL 2,314,062
METHOD AND APPARATUS FOR MARBLEIZING PLASTIC COMPOSITIONS
Filed June 3, 1940
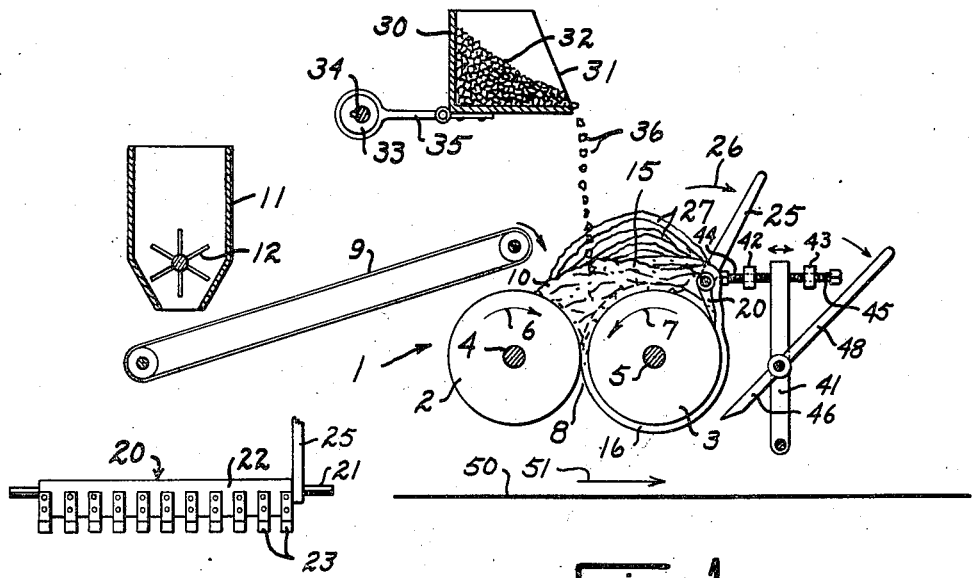
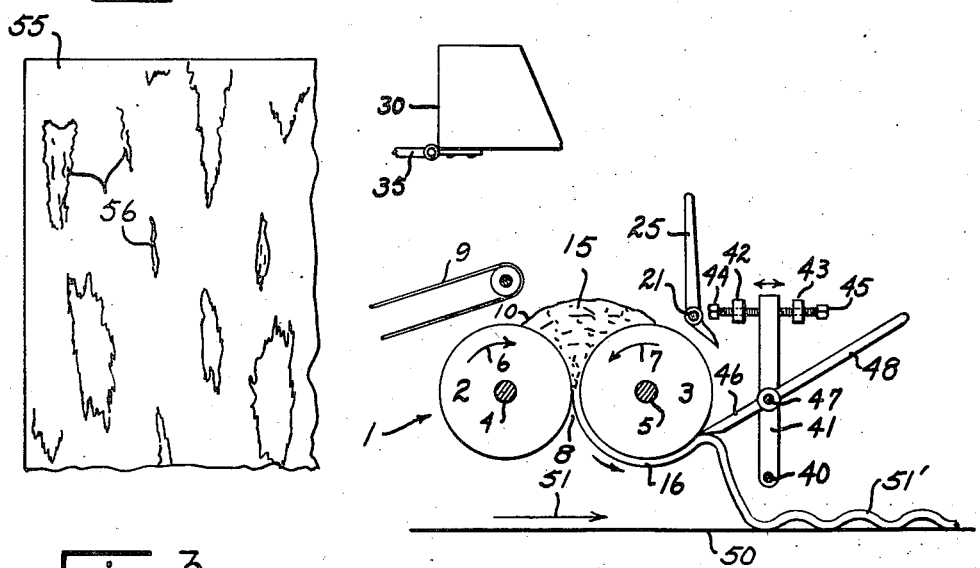
GLENN H. ALVEY
FRED HUBERT Jr.
INVENTORS.
BY Jesse R. Stone
Lester B. Clark
ATTORNEYS Patented Mar. 16, 1943

2,314,062

UNITED STATES PATENT OFFICE 2,314,062

METHOD AND APPARATUS FOR MARBLE-IZING PLASTIC COMPOSITIONS

Glenn H. Alvey, San Antonio, and Fred Hubert, Jr., Houston, Tex., assignors to Uvalde Rock Asphalt Company, San Antonio, Tex., a corporation of Texas Application June 3, 1940, Serial No. 338,578

12 Claims. (Cl. 18—10)

This invention relates to method and apparatus for producing marbleized articles from plastics and is particularly directed to a method of producing synthetic tile having striated surface markings or marble-like effects.

The principal object of the invention is to provide novel and simple method and apparatus for producing marbleized articles from plastic material.

Another object is to provide articles of the class described by supplying particles of a marbleizing material to a quantity of the plastic material positioned upon a calendering machine.

A more specific object is to marbleize a plastic material by removing strips of such material from a sheath formed upon a calender roll and returning such strips to the calender machine together with the marbleizing material whereby such material is effectively admixed to give the desired marble-like appearance.

Another object is to provide a calendering machine with a serrated or stripping knife for removing peripheral strips of plastic material from a sheath of such material formed upon a calender roll.

A further object is to provide an adjustable sheath serrating knife for removing a sheath of plastic material from a calender roll.

The foregoing objects together with others will be apparent from the following description of the method and apparatus of the invention considered in connection with the accompanying drawing in which:

Fig. 1 is a diagrammatic elevational view illustrating one form of apparatus and the manner of carrying out the method of the invention;

Fig. 2 is a diagrammatic elevations view illustrating the manner of removing a sheet of marbleized plastic material from the roll of a calendering machine;

Fig. 3 is a plan view of a flat article produced in accordance with the invention;

Fig. 4 is an elevational view of the stripping knife used in the apparatus of the invention.

In the drawing illustrating the invention a calendering machine generally referred to as 1 is shown diagrammatically as comprising calender rolls 2 and 3 mounted upon shafts 4 and 5 and rotated in the directions indicated by the arrows 6 and 7.

These rolls are slightly spaced at 8 in a manner well known in the art and it is to be understood that any suitable spacing may be provided thru adjusting means (not shown) so that production requirements are satisfied.

The rolls 2 and 3 are heated in any suitable manner, the roll 2 being elevated to a higher temperature than the roll 3 so that the plastic material 10 will adhere to the latter.

The plastic material 10 is preliminarily prepared within a mixer 11 provided with an agitator 12. Such prepared material when leaving the mixer 11 is ready or substantially ready for forming into any desired article except that it is desirable to add thereto a marbleizing or variegating material so that the finished article will possess a pleasing striated colored effect. It is to be understood that the exact manner of preparing the plastic is not material to the present invention and accordingly the mixer 11 is shown as illustrative of mechanisms which may be used for preparing the material as is well known in the art. It may be noted that the material to be utilized may, and preferably is thermo-plastic or thermo-setting but it is to be understood that the invention is not confined to these particular types of plastic materials.

A quantity of prepared plastic 10 is transferred by the conveyor 9 from the mixer 11 to the calender 1 where it is deposited in a bank upon the rolls 2 and 3. The rotation of these rolls causes a sheath 16 of the material 10 to form upon the cooler roll 3, whereupon, if an excess of material has been deposited, there remains a bank 15 of the material and it is the purpose of the invention to add to this bank of material and the material of the sheath 16 a marbleizing material so that a marbleizing effect is produced in the materials which are subsequently severed from the roll 3.

Adjacent the uppermost part of the roll 3 is provided a stripping knife 20 which comprises a shaft 21 extending transversely of the calendering machine 1. A bar 22 is attached to the shaft 21 and a plurality of teeth or stripping blades 23 are secured to this bar and extend downwardly therefrom. These blades are of such length that, when the bar 22 is tilted by means of the lever 25 in the direction indicated by the arrow 26, they enter the sheath 16 at spaced points whereby strips of the plastic material are severed from the sheath and these strips move upwardly over the bar 22 and pile loosely and in intermingled relation upon the bank 15 from which material is constantly withdrawn to fill the annular grooves cut in the sheath 16.

Mounted above the bank 15 is a container 30 having a side opening 31 which extends longitudinally of the rolls 2 and 3. A quantity of marbleizing material 32 previously prepared and in the form of small particles or fragments is placed within the container 30. Such material is caused to fall upon the bank 15 by means of the eccentric 33 on shaft 34, such eccentric being operatively connected to the container by means of a connecting rod 35.

In the operation of the device thus far described a quantity of the plastic material to be marbleized is first placed upon the rolls 2 and 3, whereupon a sheath 16 immediately forms upon the roll 3. The arm 25 is then moved as indicated by the lever 26 so that the stripping knife 20 is tilted and strips 27 are severed from the sheath 16 and moved upwardly over the knife to form a heterogeneous pile upon the bank 15 as already pointed out. As this operation continues power is applied to the shaft 34 and particles 36 of the marbleizing material 32 are caused to fall upon the bank 15 and among the strips 27 of the plastic material. As already indicated material of the bank 15 is constantly drawn into the grooves formed by the cutting blades 23 and such material carries therewith particles of the marbleizing material. This material is thus uniformly admixed with the entire batch of plastic material 10.

Attention is directed to the fact that the mixing is not continued to a point where the marbelizing particles lose their identity. On the contrary, the stripping and kneading action of the rolls is continued only to that point where there is produced a striated effect in the material of the sheath 16. The operation is such, however, that a similar effect is produced upon the material of the bank 15 when such bank is drawn between the rolls as the sheath 16 is severed from the roll 3 in a manner hereafter described.

In order to obtain the results just indicated the shaft 34 is stopped when a sufficient quantity of the material 32 has been added to the plastic. Thereafter the stripper knife is lifted and the marbleizing of the material of the sheath 16 and the bank 15 is completed.

Pivotally mounted at 40 upon opposite sides of the calendering machine 1 are two arms 41 which terminate between ears 42 and 43 on the frame of the machine. Adjusting screws 44 and 45 in these ears enable desirable positioning of the arms which carry a blade 46 which may be tilted upon a pivot 47 by means of the lever 48. After the marbleizing of the quantity of plastic has been completed, the blade 46 is tilted forwardly to sever the sheath 16 from the roll 3, such sheath moving downwardly by gravity and being deposited upon a conveyer 50 moving in the direction indicated by the arrow 51.

The adjustment of the arms 41 is important in determining the physical conditions of the sheet 51′ deposited upon the conveyer 50. If, for example, the severing action takes place with the blade 46 substantially tangential to the roll 3, the sheet 51 is relatively smooth and of the entire width of the calendering machine. When, however, the blade 46 approaches the roll 3 substantially radially, the sheet 51 is materially craped and is substantially less in width than the calendering machine 1. Thus a sheet of desired width may be formed by altering the angle of approach of the blade 46.

The material leaving the roll 3 may be formed of articles of any desired nature. If sheet like articles such as synthetic tile are to be produced the sheet 51 stripped from the roll 3 is subjected to subsequent rolling action to obtain the desired thickness and surface condition. Such rolling is also effective in improving the striated effect of the respective particles of the marbleizing material 32.

An example of such an article is illustrated in Fig. 3 which shows a portion of a synthetic tile 55. Upon the surface of this tile appear a plurality of striations 56 each of which is produced by a small piece of the marbleizing material. Attention is directed to the fact that the desired markings are desirably distributed over the surface of the article 55, a result which may be readily accomplished in accordance with the invention. Furthermore, altho the individual markings or striations 56 may or may not extend entirely thru the article, desirable markings also appear upon the opposite side of the article due to the presence of other particles at points adjacent that surface.

While specific technique and instrumentalities have been disclosed, it is intended that the invention shall not be confined thereto but broadly comprehends method and apparatus for desirably distributing a marbleizing material throughout a plastic material whereby there is presented a striated or marble-like appearance of an article produced from such material.

What is claimed is:

1. In the method of producing marbleized articles from thermoplastic material the steps of depositing a mass of such material upon calender rolls of different temperatures so that a sheath of the material forms upon one of the rolls, severing spaced strips of the material from such sheath and feeding such strips between the rolls, and simultaneously feeding small masses of a marbleizing material among said strips whereby the sheath upon the calender roll is streaked with such marbleizing material.

2. In the method of producing marbleized articles from thermoplastic material the steps of, feeding a mass of such material upon calender rolls of different temperatures so that a sheath of the material forms upon one of the rolls and a bank of material rests upon the rolls, severing spaced strips of the material from such sheath, feeding such strips upon the bank of material, and simultaneously feeding small masses of marbleizing material among the strips and upon the bank whereby the mass of thermoplastic is streaked with the marbleizing material.

3. In the method of producing marbleized articles from plastic material the steps of, feeding a mass of such material between calender rolls in a manner that a sheath of the material forms upon one of the rolls, severing spaced strips of the material from said sheath, feeding such strips between the rolls to refill the grooves formed by the removal of the strips, and simultaneously feeding small masses of marbleizing material among the strips so that the material of the sheath is streaked with the marbleizing material.

4. In the method of producing marbleized articles from plastic material the steps of, feeding a mass of such material between calender rolls to form a sheath of material upon one of the rolls, continuously severing spaced strips of the material from said sheath, feeding such strips upon the rolls, feeding small masses of marbleizing material among the strips upon the rolls, and thereafter successively discontinuing the feeding of the marbleizing material and the severing of strips from the sheath whereby the material of the sheath is streaked with the marbleizing material.

5. In the method of producing a marbleized effect of plastic material the steps of, feeding upon calender rolls a plurality of strips of the material to be marbleized, and simultaneously feeding small masses of marbleizing material among the strips so that the sheath formed upon one of the rolls is streaked with the marbleizing material.

6. In the method of producing marbleized articles from a plastic material the steps of, feeding a mass of such material between calender rolls to form a sheath of the material about one of the rolls and a bank of the material upon the rolls, severing spaced strips of the material from said sheath, lifting such strips from the roll and depositing such strips upon the bank of material, and simultaneously feeding small masses of marbleizing material among the strips and upon the bank of material.

7. In the method of producing marbleized articles from a plastic material the steps of, feeding a mass of such material upon calender rolls to form a sheath of the material about one of the rolls and a bank of the material upon the rolls, severing spaced strips of the material from said sheath, simultaneously depositing such strips upon the bank of material and feeding small masses of marbleizing material among the strips and upon the bank of material, thereafter discontinuing the stripping and the feeding of the marbleizing material, whereby the marbleizing material is irregularly streaked throughout the mass of plastic material.

8. In the method of producing marbleized articles from a plastic material the steps of, depositing a mass of such material between calender rolls to form a sheath of the material about one of the rolls, severing spaced strips of the material from said sheath depositing the strips upon the rolls, simultaneously feeding small masses of marbleizing material among the strips, thereafter successively discontinuing the feeding and severing steps, and then removing the sheath of marbleized material from the rolls.

9. In a device of the class described the combination of, calendering rolls adapted to receive a quantity of plastic material and form a sheath of such material upon one of the rolls, means for severing and lifting spaced strips of the material from said sheath and depositing such strips upon the rolls, and means for distributing particles of a marbleizing material among the strips whereby a marbleized effect is imparted to the mass of plastic material.

10. In a device of the class described the combination of, calendering rolls adapted to receive a quantity of plastic material and form a sheath of such material upon one of the rolls, means for severing and lifting spaced strips of the material from said sheath and depositing such strips upon the rolls, means for distributing particles of a marbleizing material among the strips whereby a marbleized effect is imparted to the mass of plastic material, and means for removing the sheath of marbleized material from the roll.

11. In a device of the class described the combination of, a pair of calendering rolls operated at different temperatures whereby a mass of plastic material deposited upon the rolls forms a sheath upon one of the rolls, means for severing and lifting spaced strips of the material from the sheath and depositing such strips upon the rolls, and means for distributing particles of marbleizing material among the deposited strips so that a marbleized effect is imparted to the mass of plastic material.

12. In a device of the class described the combination of, a pair of calendering rolls, means for depositing a quantity of plastic material upon said rolls so that a sheath is formed upon one of the rolls and a bank of the material remains upon the rolls, means for severing and lifting spaced strips of the material from the sheath and depositing such strips upon the bank of material, and means for distributing particles of a marbleizing material among the strips and upon the bank.

GLENN H. ALVEY.
FRED HUBERT, Jr.